Feb. 24, 1948.    R. G. ROWE    2,436,732
HIGH-FREQUENCY ELECTRIC FIELD HEATING
Filed May 12, 1944    2 Sheets-Sheet 1
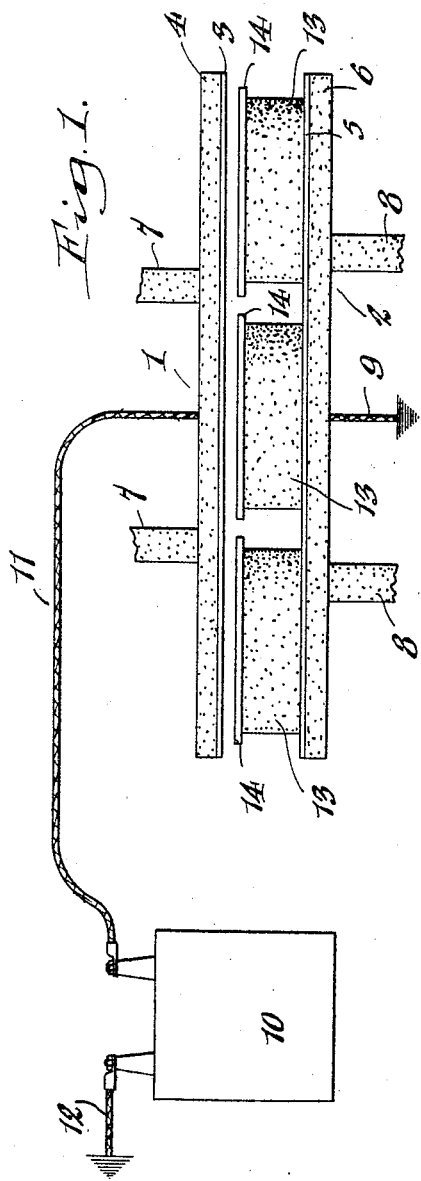
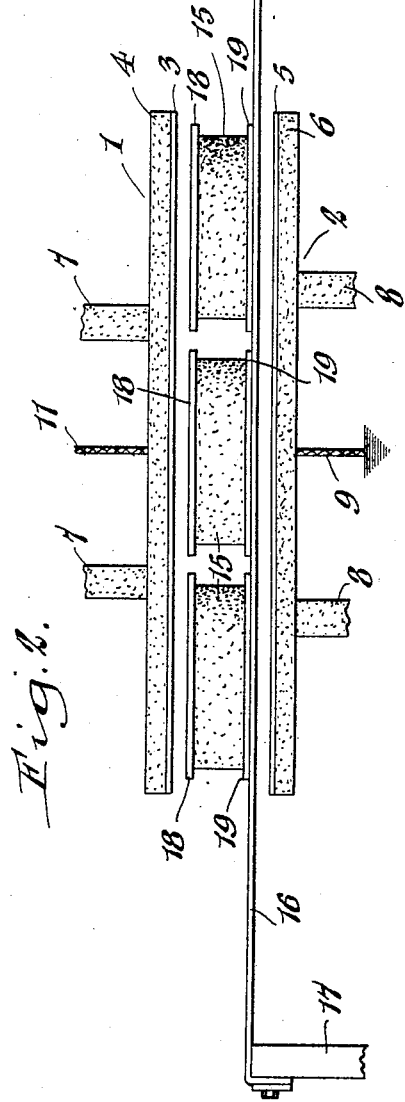
INVENTOR.
ROBERT G. ROWE
BY W. Foley
Attorney

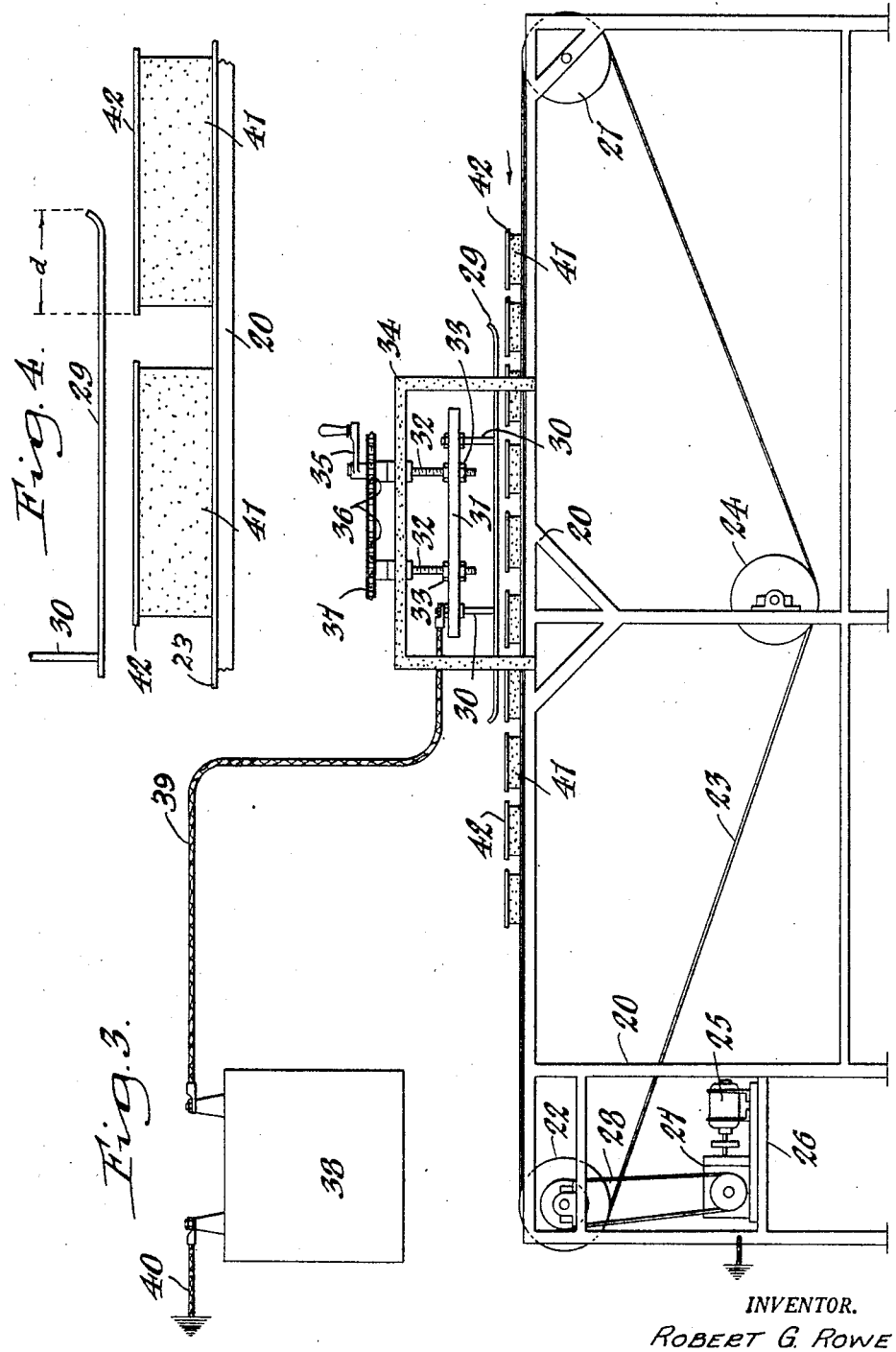

Patented Feb. 24, 1948

2,436,732

UNITED STATES PATENT OFFICE 2,436,732

HIGH-FREQUENCY ELECTRIC FIELD HEATING

Robert G. Rowe, Niagara Falls, N. Y., assignor to The Carborundum Company, Niagara Falls, N. Y., a corporation of Delaware Application May 12, 1944, Serial No. 535,247

6 Claims. (Cl. 219—47)

This invention relates to the heating of articles through the application of electric energy. More particularly, it relates to a method of heating articles by subjecting them to the action of a high frequency electric field.

Among the objects of the invention is the provision of an improved method of heating articles by a high frequency electric field whereby injury and possible destruction of the articles caused by arcing are prevented. The invention provides, in addition, a method whereby articles may be heated uniformly throughout their extent when moved continuously into and through the field. The invention also provides a method of inducing in articles so treated gradually increasing molecular activity, whereby injury to the articles which may occur when they are subjected at once to the full intensity of the field, is avoided. These and further objects of the invention will become evident as the description proceeds.

The heating of articles by exposure to high frequency electric fields where the material to be heated is of such character that it is significantly affected by such field has been common in the art. The heating action of high frequency electric fields appears to be due to molecular friction, that is, the molecules of substances so affected appear to attempt to align themselves with the field and to turn or attempt to turn with each reversal of the field. The rapid motion of the molecules so induced gives rise to a uniform rise in the temperature throughout the extent of the articles in the field. Substances which contain an appreciable amount of water or other liquid such as undried ceramic mixes, uncured resins, and cements are strongly affected by high frequency electrostatic fields. Consequently such method of heating has become of great value in the drying of various articles such as ceramic mixes and the curing of adhesive layers between for example, layers of plywood and between cemented portions of various articles such as shoes and the like. The method has also been employed with success in the preheating of plastic materials before molding, in the curing of such molded plastics, and in the curing of resin and rubber bonded abrasive articles, and in the drying of ceramic and ceramic bonded articles. Although the method of the present invention will be particularly described in its application to the curing of organic bonded abrasive articles and to the drying, prior to firing, of ceramic bonded abrasive articles, it is to be understood that it displays advantages in the heating, drying or maturing of various other articles such as those discussed above.

In order to make heating by high frequency electric fields as fast and economical as possible it is desirable to employ a field of very high strength. In order to accomplish this the electrodes are preferably placed in contact with the articles being heated. This method is feasible where only one article is heated at one time in the apparatus and it is not impractical to open the electrodes and close them each time a heated article is removed from the apparatus and a new one is introduced. This method can not be used where a plurality of articles not almost identical in thickness are heated side by side between the electrodes, since the adjustable electrode will contact the thicker articles only and arcs will occur between such electrode and the thinner articles. It also can not be used where articles are moved continuously through the field by a conveyor.

To overcome such difficulties of arcing to thinner articles when a plurality are so heated, and to allow a continuous conveying system to be employed, the articles have been placed on the bottom electrode and the upper electrode has been spaced a substantial distance above the upper surfaces of the articles. The spacing of the upper electrode is rather critical, however, since it is often desirable to operate at a point where the field strength approaches the breakdown of the medium, the air gap and the material being heated, which lies between the electrodes, in order to obtain maximum efficiency. When breakdown does occur as a result of unequal spacing of the electrodes or of the presence of even small imperceptible protuberances on the surface of the articles, an arc is formed between such article and the electrode which is spaced from it. Such arc results in localized charring and pitting of the articles and if allowed to continue, particularly in the case of the organic substances, may result in their total destruction. By use of the present invention, which includes the use of a continuous layer of material of good electrical conductivity on the surface or surfaces of the article to be heated which are spaced from the electrode or electrodes, arcing between the electrodes and the article, if it does occur, takes place between the electrode and the protecting conducting layer so that the article is not subjected to localized charring.

The invention displays particular advantages in the heating of articles by high frequency electric fields when such articles are introduced into the field on a continuously moving conveyor. In accordance with the prior art, articles have been supported on a slowly moving continuous conveyor and have then been introduced progressively into the field and then moved slowly through it. Although economical and easily handled, such method has the serious disadvantage that the entering portions of the article are subjected to heat before the middle and trailing portions of the article, and thus the entering portions begin to dry or be matured before the other parts thereof. This results in the production of an article having an uneven structure, and what is more serious, results in the setting up of stresses between successive portions of the articles. In addition, in accordance with the prior art method, those portions of the article entering the field, which is fairly sharply defined, are subjected almost at once to the full heating intensity of the fields, a procedure which is undesirable in the cases of many substances.

The first of these latter two difficulties attendant upon using a conveyor moving at a uniform rate may be obviated by use of a conveyor which moves at alternately fast and slow rates and by so spacing the articles upon it that they are introduced completely into the field during the period of fast travel and travel through the field at a slow rate. Such system is complicated and expensive and requires the use of a much longer apparatus than one necessary for use with a continuously uniformly moving conveyor. The alternately fast and slow conveyor system does not overcome the objection of the sudden subjection of the article to the full heating effect of the field. In fact it aggravates such condition since the article does not progress slowly through the boundary of the field as it does when the conveyor moves continuously at a uniform rate. Such system is also open to the objection that it subjects the articles on the conveyor, which are often fragile in character, to mechanical shocks upon acceleration and deceleration of the conveyor.

The provision of a continuous layer of material of good electrical conductivity on the surface or surfaces of the article being heated, in accordance with the present invention, when introduced into the field by means of a conveyor moving at a uniform rate produces uniform heating of the article throughout its extent and when the article is entering the field subjects it to heat of gradually increasing intensity.

The invention will be more readily understood by reference to the accompanying drawings in which:

Figure 1 is a diagrammatic view in side elevation of apparatus constructed in accordance with one modification of the invention, Figure 2 is a similar view of apparatus constructed in accordance with a further modification of the invention, Figure 3 is a view in side elevation of apparatus employing a continuously driven conveyor for carrying articles into and through a high frequency electrostatic field, and, Figure 4 is an enlarged view of a portion of the apparatus shown in Figure 3 at the entering edge of the electrostatic field.

The apparatus shown in Figure 1 comprises upper and lower electrodes designated generally by the characters 1 and 2, respectively. In the modification shown the electrodes consist of relatively thin metal sheets supported on insulating electrode carriers. In Figure 1 the upper electrode is designated 3 and its insulating carrier 4 and the lower electrode is denoted by the numeral 5 and its insulating carrier by numeral 6. The upper and lower electrodes and electrode carriers are supported by insulating supports 7 and 8, respectively. Means (not shown) are provided to vary the spacing between the upper and lower electrodes. Bottom electrode 5 is connected to ground by cable 9, and upper electrode 3 is connected to one side of the output of a high frequency oscillator 10 by cable 11. The other side of the output of the oscillator is connected to ground through cable 12.

Articles 13 which may be, for instance, molded uncured resin bonded abrasive wheels or molded undried unfired ceramic bonded wheels, are placed between the electrodes resting upon bottom electrode 5. On the upper faces of each article 13 from which, in this instance, the upper electrode 3 is spaced by an air gap to allow the introduction and withdrawal of the articles, there is placed a sheet 14 of material having good electrical conductivity. The electrical conductivity of sheet 14 should be much higher than that of article 13, the electrical conductivity of which is low. An ideal material for such purpose is thin sheet metal such as copper. After the articles with their protecting conducting layers have been placed between the electrodes, the oscillator is turned on and the articles subjected to the heating field for a predetermined length of time. If during such heating period an arc should strike from electrode 3 through the air gap to metal plate 14, due to momentary variations such as variations in field strength, the arc does not injure articles 13 by overheating as it would without the presence of layer 14. When it occurs the arc may be easily extinguished by momentary cutting off of the oscillator 10 or by decreasing the field strength between the electrodes. If desired, to prevent sticking of the articles to the bottom electrode and to support the articles more rigidly, they may be supported on a ceramic batt resting on the bottom electrode. In such case a protecting layer of metal may be used in contact with the lower surface of article 13, although this is not absolutely necessary since arcs do not ordinarily occur through the batt and when they do they are of low intensity.

It is to be understood that layer 14 may be a preformed sheet of any metal of good electrical and heat conductivity as well as copper, and that it need not be preformed and assembled on the article but may be formed thereon in situ as by a spraying operation.

The modification of the apparatus shown in Figure 2 is useful where it is desired to avoid the inevitable chilling effect upon the article being heated caused by its resting directly upon the lower electrode or upon a batt, both of which have appreciable capacity to absorb heat from the articles being heated. In Figure 2 the electrodes and their supports are the same as in Figure 1 and they are similarly labelled. The same is true of the power supply therefor of which only the ground wire 9 and a portion of cable 11 are shown. In Figure 2 articles 15 to be heated rest upon a thin elongated support spaced from the bottom electrode. As shown such support is in the form of a belt 16 supported between end supports 17 under sufficient tension to avoid appreciable sagging under load. Belt 16 is preferably one with low heat conductivity to avoid appreciable cooling of the bond of the article being heated, and of high electrical insulating value. It has been found that a material ideally suited for such purposes is woven glass fabric which is of high strength, low heat conductivity and very good electrical insulating properties, and is not injured should a momentary arc strike from the bottom electrode to the bottom of the articles being heated.

In accordance with the present invention in the modification shown in Figure 2 thin layers of material of high electrical conductivity are provided on the top surface of the articles being heated. In order to extend the benefits of such conducting layer to the bottom surface of articles 15, a similar conducting layer 19 is provided in contact with the bottom surface thereof. As in the case of the apparatus in Figure 1, should an arc strike between an electrode and a protecting layer on the article the article will not be injured as the layer, since it is of good heat conductivity, will be heated as a whole and will not allow localized overheating and charring of article 15. As explained above, if an arc should occur it may be readily extinguished by momentary lowering or cutting off of the electric field between the electrodes.

In the apparatus in both Figures 1 and 2 the layers of metal in contact with one or more surfaces of the article themselves act as electrodes. They receive power from electrodes 3 and 5 by capacitive coupling and deliver it to the article being heated with which they are in contact.

The apparatus shown in Figure 3 shows the invention applied to the continuous conveyor method of heating articles by an electric field in which it finds particular advantage. As there shown, the apparatus consists of a frame 20 which may be constructed of angle irons welded or bolted together. The frame is provided at opposite ends thereof with pulleys 21 and 22 so located that their peripheries at the top are slightly above the top members of the frame. A continuous conveyor belt 23, which in this instance is made of hard drawn brass, runs around pulleys 21 and 22 and around idler pulley 24 which is located in the center of the bottom run of the conveyor belt. Idler pulley 24 may be adjusted vertically by means not shown to vary the tension in the belt. The upper horizontal portion of the conveyor belt 23 runs over and is supported by means such as wooden slats (not shown), the top surfaces of which are approximately flush with the top surface of frame 20. Conveyor belt 23 is driven at a slow speed by means of motor 25, located on sub-frame 26, motor 25 driving pulley 22 through the medium of the compound speed reducer 27 and chain 28.

An electrode 29 is suspended approximately mid-way of the horizontal run of the conveyor by means consisting of bolts 30 attached to insulator plate 31. Plate 31 is mounted for vertical adjustment by means of a plurality of screws 32 running through nuts 33 positioned in the plate. Screws 32 are supported on an insulating frame 34 attached to the top of frame 20 and are turned by means of an adjusting handle 35 attached to one of the screws, the screws being connected together by means of sprockets 36 and chain 37. Conveyor belt 23 is connected to ground through the medium of pulleys 21 and 22 which are of metal and metal frame 20. Electrode 29 is connected to one side of the output of the high frequency oscillator 38 by means of cable 39 attached to one of the supporting bolts 30. The other side of the output of the oscillator 38 is connected to ground by means of cable 40.

Conveyor 23 travels very slowly as, for instance, one foot per minute, in the direction indicated by the arrow in Figure 3. A plurality of substantially similar articles 41, which may be molded uncured resin bonded abrasive wheels or wet unfired molded ceramic bonded wheels are placed on the conveyor in spaced relationship at the right hand end of the apparatus shown in Figure 3. The length of the field and the speed of the conveyor are made such that the heating operation, which may be the curing of an organic bonding material or the drying of a ceramic body is completed after the article has travelled once through the field. Oscillator 38 is turned on to provide a high intensity electric field between the electrode 29 and conveyor belt 23, and motor 25 is started thereby initiating movement of the conveyor belt to the left to carry the articles slowly into the field. As the conveyor travels additional article 41 may be placed on the conveyor at the right hand end thereof thereby making the heating process a continuous one.

Articles 41 are provided, in accordance with this invention, with thin sheets of metal of good electrical conductivity on the top surfaces thereof, such sheets being designated 42. The vertical adjustment of electrode 29 is usually made such that the electric field subtended across body 41 is at the maximum strength permissible without arcs occurring from the electrode to plates 42 and still leaving adequate clearance for the passage of body 41 and sheet 42. As each article 41 enters the boundary of the electric field its protecting plate 42 receives a gradually increasing voltage and consequently article 41 receives a gradually increasing amount of power from the circuit to which it is capacitatively coupled. When the article is just entering the field plate 22 is very loosely coupled to the power source. The amount of power delivered to it is small and therefore its heating effect upon the article 41 is small. Such article will be heated uniformly throughout its extent, however, since plate 42 extends over its entire upper surface. As more and more of article 41 and cover plate 42 come under electrode 29 plate 42 and article 41 become more tightly coupled to the power source and consequently more power is delivered to the article. This in turn produces an increasingly intense heating effect upon the article. Such heating effect reaches a maximum when the article with plate 42 has entirely entered the field and such maximum heating effect continues until the leading edge of the article begins to emerge from under the electrode.

In Figure 4 the relationship between plates 42 and electrode 29 is shown more clearly. The article 41 shown at the left is being subjected to the maximum heating effect of the field since it lies entirely under the electrode 29, whereas the right hand article 41 and its plate 42 lies under the electrode only to the extent indicated by the character d, and such article is at that particular time subjected to a heating effect which is much less than the maximum. As explained above when used with a continuous conveyor such as shown in Figure 3 the present invention finds particular advantage since it subjects the entire article to a uniform but gradually increasing heating effect. Without the presence of plate 42 in Figure 4 the right hand article 41 would be subjected to the full heating effect of the field in its leading portion to a distance roughly approximating that under the electrode 29, whereas, the remainder of the article would be unheated except for conduction from the heated portion. Practice of the present invention in this modification therefore results in articles which are much more uniform and free from stresses than those produced by prior continuous conveyor methods. In addition the use of plates 42, which may be preformed or may be formed in situ, prevents articles 14 from being injured or destroyed should an arc occur to the article from the upper electrode.

Although the articles being heated have been shown in Figures 3 and 4 as resting directly upon the conveyor, it is obvious that they may be supported, if desired, upon means such as ceramic batts which in turn rest on the conveyor. If supports such as ceramic batts are employed it may be desirable to protect the bottom face of the article by metal plates of good electrical conductivity similar to top plate 42. Although conveyor belt 23 has been described as of electrical conducting material, and, in the modification shown, has been made one of the metal heating electrodes, it is obvious that an insulating conveyor made of such material as woven glass fiber may be employed and the bottom electrode may be a fixed member similar to electrode 29. In such case it is desirable to employ a bottom metal protecting plate under the article as well as a protecting plate on top of the article.

In the claims I have used the term "of relatively poor electrical conductivity" to mean articles of the type referred to earlier in the specification such as ceramic mixes and plastic materials, including rubber and resin, for the purpose of distinguishing from materials such as metals which have a relatively high electrical conductivity.

Having thus fully described the invention I desire to claim as new the following:

1. In a method of heat-treating articles of relatively poor electrical conductivity and having two opposite broad faces the steps which comprise placing on at least one of the said broad faces a layer of material having an electrical conductivity materially higher than that of the article and an area substantially as great as that of the said broad face, and then subjecting the article while at least the sides thereof are unconfined to the action of a high frequency electric field between a pair of electrodes confronting the said broad faces and spaced apart a greater distance than the thickness of the article, the electrode which confronts at least one side of the article which is provided with the electrically-conducting material being spaced a material distance therefrom.

2. In a method of heat-treating articles of relatively poor electrical conductivity and having two opposite broad faces the steps which comprise placing the article on an electrode on one of its broad faces, providing on the other broad face a layer of material having an electrical conductivity materially higher than that of the article and an area substantially as great as that of the said broad face, and then subjecting the article while at least the sides thereof are unconfined to the action of a high frequency electric field between the said electrode and a second electrode which confronts the side of the article which is provided with the electrically-conducting material and which is spaced a material distance therefrom.

3. In a method of heat-treating articles of relatively poor electrical conductivity and having two opposite broad faces the steps which comprise providing each of the broad faces of the article with a layer of material having an electrical conductivity materially higher than that of the article and an area substantially as great as that of the said broad face, and then subjecting the article while at least the sides thereof are unconfined to the action of a high frequency electric field between a pair of electrodes confronting the said broad faces, at least one of the said electrodes being spaced a material distance from one of the highly conductive layers.

4. In a method of heat-treating articles of relatively poor electrical conductivity and having two opposite broad faces the steps which comprise placing on at least one of the said broad faces a layer of material having an electrical conductivity materially higher than that of the article and an area substantially as great as that of the said broad face, and then advancing the article while at least the sides thereof are unconfined into and through a high frequency electric field set up by a pair of electrodes confronting the said broad faces and spaced apart a greater distance than the thickness of the article, the electrode which confronts at least one side of the article which is provided with the electrically-conducting material being spaced a material distance therefrom.

5. In a method of heat-treating articles of relatively poor electrical conductivity and having two opposite broad faces the steps which comprise placing the article on an electrode on one of its broad faces, providing on the other broad face a layer of material having an electrical conductivity materially higher than that of the article and an area substantially as great as that of the said broad face, and then advancing the article while at least the sides are unconfined into and through a high frequency electric field set up between the said electrode and a second electrode which confronts the side of the article which is provided with the electrically conducting material and which is spaced a material distance therefrom.

6. In a method of heat-treating articles of relatively poor electrical conductivity and having two opposite broad faces the steps which comprise providing each of the broad faces of the article with a layer of material having an electrical conductivity materially higher than that of the article and an area substantially as great as that of the said broad face, and then advancing the article while at least the sides thereof are unconfined into and through a high frequency electric field set up between a pair of electrodes confronting the said broad faces and spaced apart a distance greater than the thickness of the article, and supporting the article in its travel so that at least one of the layers of conducting material on a face thereof is spaced a material distance from its confronting electrode.

ROBERT G. ROWE.

REFERENCES CITED

The following references are of record in the file of this patent:

UNITED STATES PATENTS

| Number | Name | Date |
|---|---|---|
| 1,900,573 | McArthur | Mar. 7, 1933 |
| 2,304,958 | Rouy | Dec. 15, 1942 |

Certificate of Correction

Patent No. 2,436,732. February 24, 1948.

ROBERT G. ROWE

It is hereby certified that error appears in the printed specification of the above numbered patent requiring correction as follows: Column 8, line 40, claim 5, after the word "sides" insert *thereof*; and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.*